July 4, 1961    G. R. CEPERO    2,990,664
METHOD FOR FINISHING CONTACT LENSES
Filed Sept. 2, 1958    4 Sheets-Sheet 1
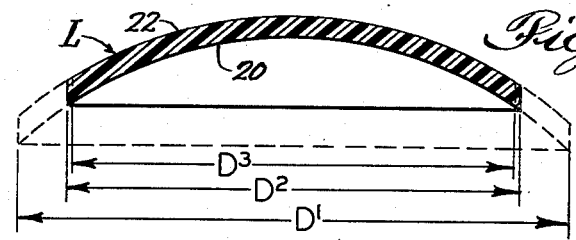
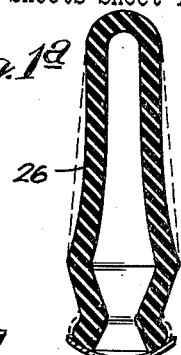
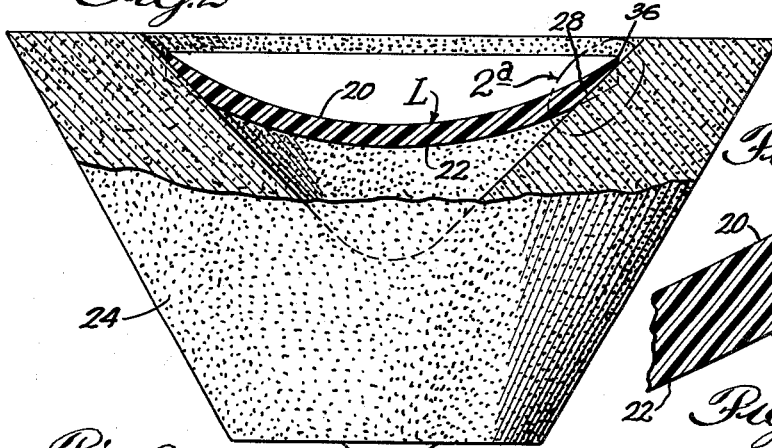
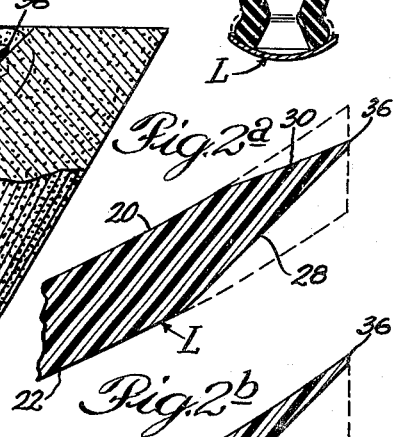
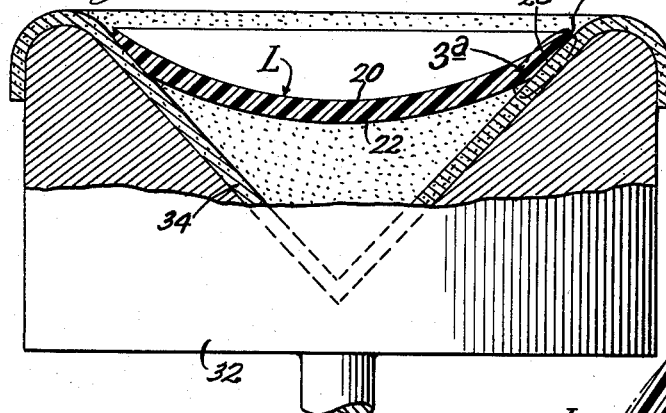
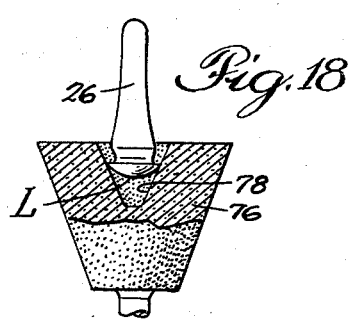
INVENTOR:
Gilberto R. Cepero,
BY Bair, Freeman & Molinare
ATTORNEYS.

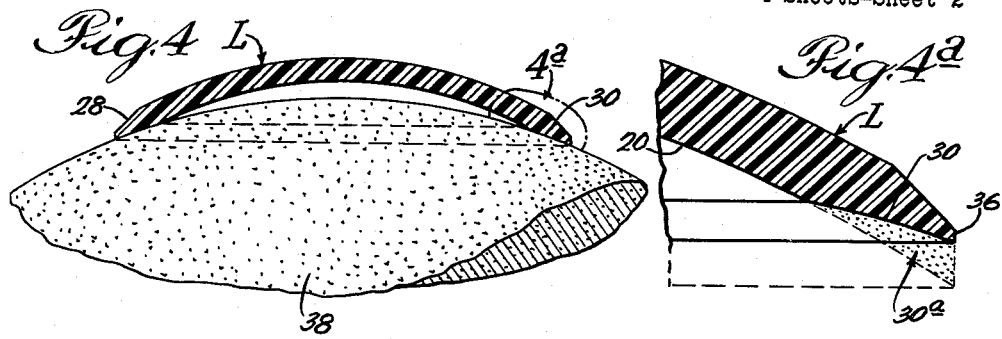
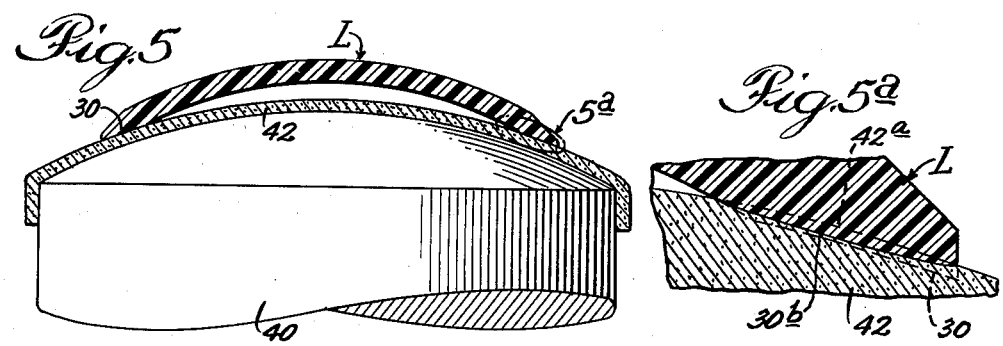
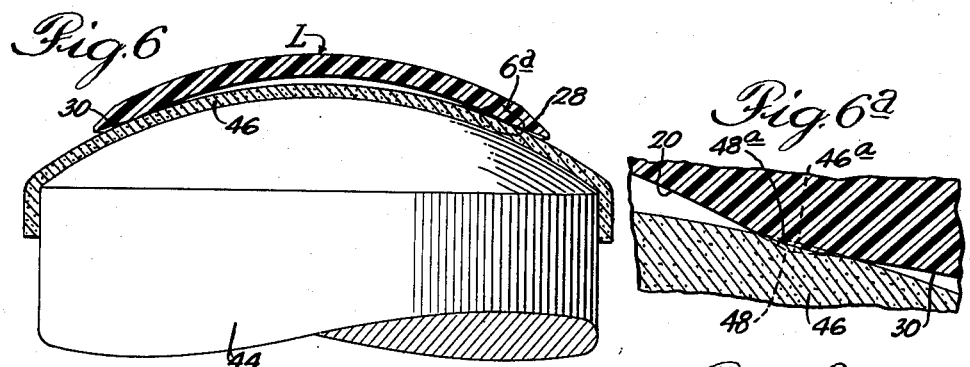
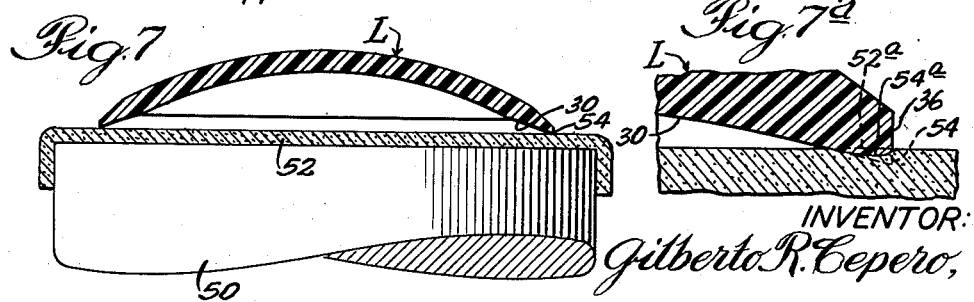

July 4, 1961  G. R. CEPERO  2,990,664
METHOD FOR FINISHING CONTACT LENSES
Filed Sept. 2, 1958  4 Sheets-Sheet 3
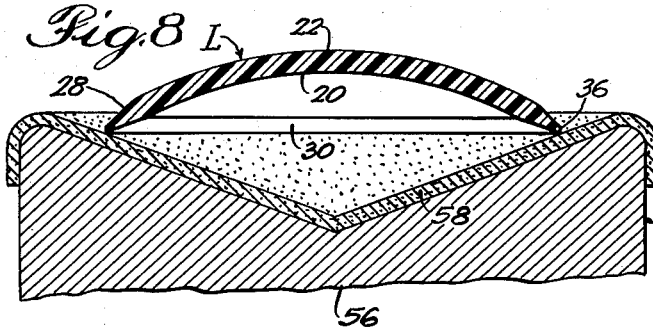
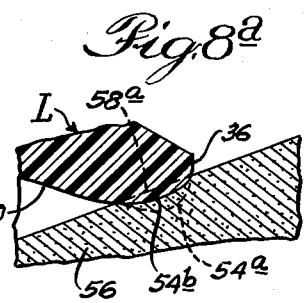
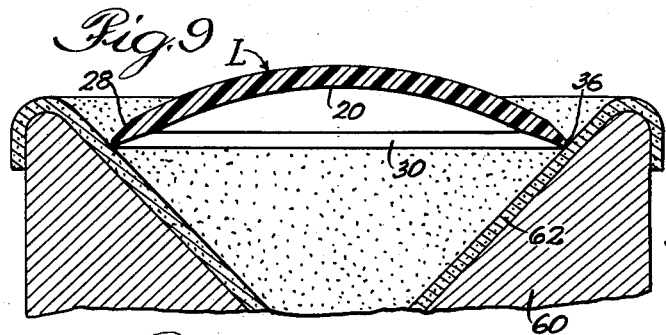
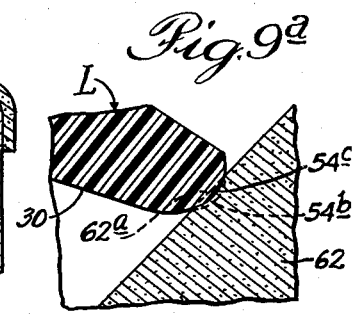
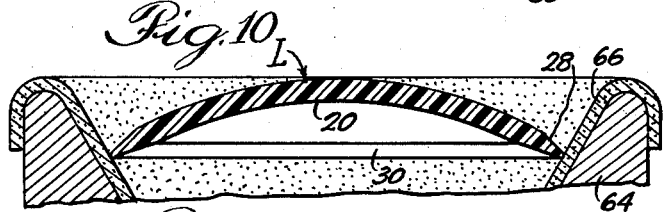
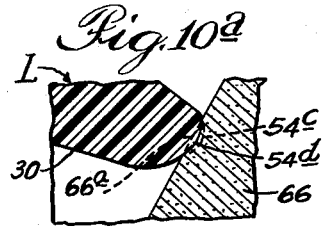
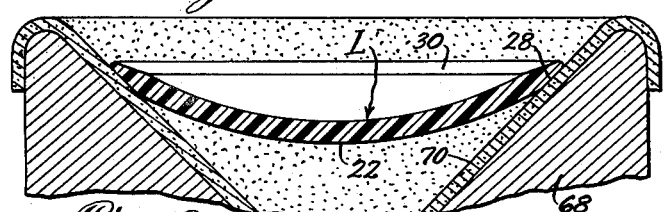
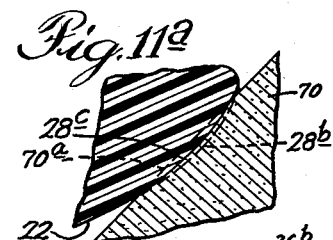
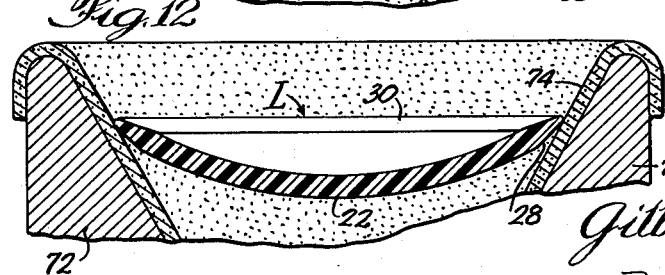
INVENTOR:
Gilberto R. Cepero,
BY Bair, Freeman & Molinare
ATTORNEYS.

July 4, 1961  G. R. CEPERO  2,990,664
METHOD FOR FINISHING CONTACT LENSES
Filed Sept. 2, 1958  4 Sheets-Sheet 4
Fig. 13
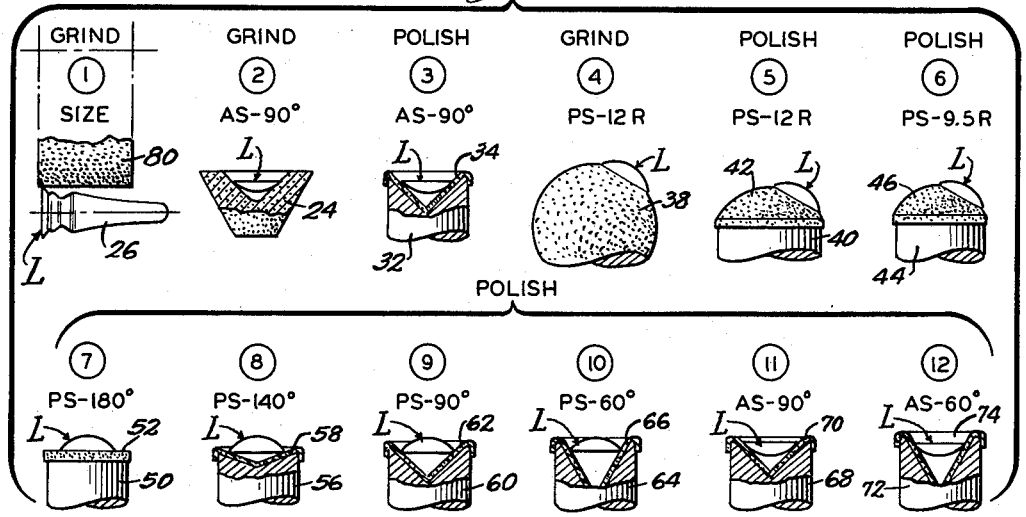
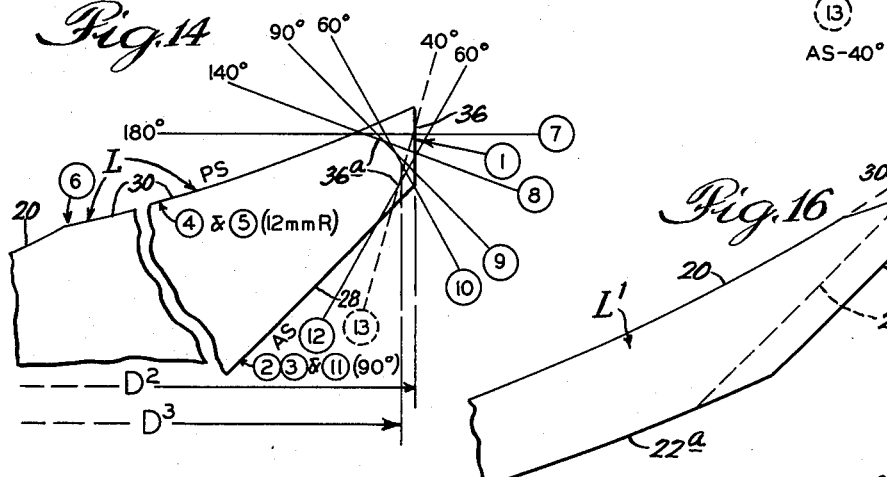
Fig. 14
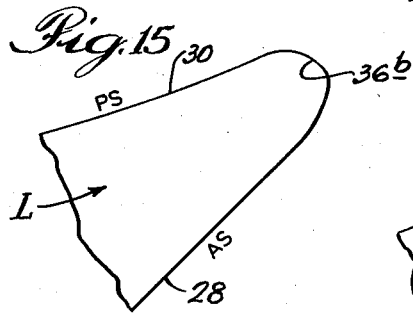
Fig. 15
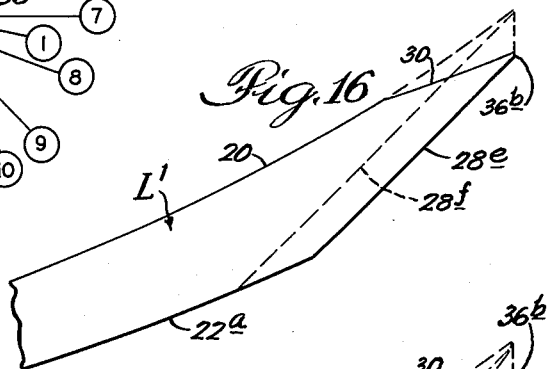
Fig. 16
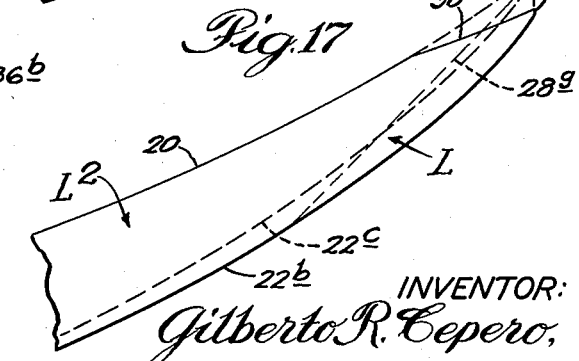
Fig. 17
INVENTOR:
Gilberto R. Cepero,
BY Bair, Freeman & Molinare
ATTORNEYS.

United States Patent Office 2,990,664
Patented July 4, 1961

2,990,664
METHOD FOR FINISHING CONTACT LENSES
Gilberto R. Cepero, Havana, Cuba, assignor to The Plastic Contact Lens Company, Chicago, Ill., a corporation of Illinois
Filed Sept. 2, 1958, Ser. No. 758,177
9 Claims. (Cl. 51—284)

This invention relates to a method and apparatus for finishing contact lenses from a "semi-finished" state such as they are sometime supplied by the manufacturer. A semi-finished lens is usually one of polymethyl methacrylate in which the base curve or inner (posterior) surface has been cut or ground to a specified radius and polished, the outer (anterior) surface has been cut or ground to a specified radius to provide the necessary power (plano, positive or negative) for the required visual correction of the cornea to which the lens is applied and such outer surface polished, and the lens has been "roughed" to a diameter larger than required (such as 10 to 12 millimeters). Some semi-finished lenses may also be of the bifocal or multifocal type with different powers in different zones thereof, such as shown in the copending applications of Wesley, Serial No. 718,851, filed March 3, 1958, and Black, Serial No. 765,553, filed October 6, 1958.

One object of my invention is to provide a method and apparatus for cutting or grinding and polishing a bevel (if required) on the anterior surface of the lens around the marginal periphery thereof after "sizing" the lens by cutting or grinding it to a desired diameter slightly larger than the final diameter required thereof, and then by successive "touch-polishing" operations at various angles with respect to the axis of the lens, rounding the anterior and posterior edges of the periphery thereof and at the same time blending with each other the transition ridges between the various angles produced by polishing, so as to result in a true and accurate rounding of the edge of the lens on the same apparatus regardless of the diameter of the lens and/or the curvatures of the two surfaces thereof varying from lens to lens.

Another object is to grind and polish a secondary curvature of the type shown in the Wesley and Jessen application Serial No. 701,153, filed December 6, 1957 (if required), on the inside or posterior surface of the marginal periphery of the lens and to blend the primary or central portion of the inner or base curve of the lens and such secondary curvature by a polishing operation in which the polishing tool has an intermediate radius between the base curve and the secondary curve.

Still another object is to provide a method and apparatus for finishing contact lenses by smoothly rounding the peripheral edges thereof in which a series of polishing tools having different angles of concavity faced with soft, depressible polishing pads and using a suitable polishing agent such as stannic oxide and water are rotated at relatively low speeds so that they do not unduly heat the lens and warp and/or craze it, and at the same time I utilize a sufficient number of steps and angles so as to effect a true rounding and blending operation, the lens being operated upon in each step only a few seconds so as to likewise prevent undue heating thereof with assurance that the lens will be properly finished in a minimum of time, and finished and polished so smoothly that it produces no irritation to the cornea or eyelids when applied to the eye. Heretofore, the peripheral edges of contact lenses have been buffed free hand in order to round them and the buffing wheels have been rotated at relatively high speeds to minimize buffing time. Microphotographs of the surfaces of such lens edges show considerable evidence of roughness that is entirely eliminated by my apparatus and method which also produce uniform smoothness and rounding that is uniformly concentric to the lens axis as compared with hand-buffed methods.

A further object is to provide apparatus for smoothly rounding the peripheral edges of contact lenses including successive polishing tools that have resilient padding thereon, the successive tools having concavities of graduated angle and the concavities being cone shaped so as to be universally applicable for finishing lenses of various diameters, yet the resilient padding effecting a polishing of the portions of the surfaces of the lenses which it contacts so as to slightly round such surfaces and thereby blend adjacent polished surfaces with each other in a substantially smooth curve that prevents any rings of contact with the cornea as experienced where adjacent cone sections or adjacent sections of different radii are not so blended and therefore irritate the cornea and eyelids, thus limiting the wearing time of the lens. When my method is used, all cornea and eyelid irritation because of rough lens edges is minimized and the wearing time thereby greatly extended.

With these and other objects in view, my invention consists in the construction, arrangement and combination of the various parts of my apparatus, and in the method steps disclosed for finishing contact lenses whereby the objects above contemplated are attained, as hereinafter more fully set forth, pointed out in my claims and illustrated in detail on the accompanying drawings, wherein:

FIG. 1 is a diametrical sectional view through a semi-finished contact lens that has been roughed to size and shows the first step (1) of my method, the scale being approximately ten times actual size;

FIG. 1a is a diametrical sectional view through a contact lens and a vacuum cup type holder therefor such as may be used in my method to hold the lens while grinding and/or polishing the same;

FIG. 2 is a diametrical sectional view through a rotary grinder wheel such as an emery stone or the like showing the second step (2) of my method in which a bevel is ground on the anterior surface of the lens;

FIG. 2a is an enlargement of the portion of the lens in FIG. 2 within the dot-and-dash outline 2a enlarged to about fifty times actual size;

FIG. 2b is a similar view showing another type of lens that may be finished in accordance with my method, certain steps thereof being eliminated as will hereinafter appear;

FIG. 3 is a sectional view similar to FIG. 2 taken through a polishing tool for polishing the surface that was ground on the lens in FIG. 2 and constitutes a third step (3) of my method;

FIG. 3a is an enlargement and exaggeration of that portion of FIG. 3 within the outline 3a thereof;

FIGS. 4 to 12 inclusive are similar to FIG. 3 showing steps (4) to (12) of my method;

FIG. 4a is an enlargement of that portion of the lens in FIG. 4 within the outline indicated 4a on FIG. 4;

FIG. 5a is an enlargement and exaggeration of the portion of FIG. 5 within the outline 5a, and FIGS. 6a, 7a, 8a, 9a, 10a, 11a and 12a are similar enlargements and exaggerations of portions of FIGS. 6, 7, 8, 9, 10, 11 and 12 respectively;

FIG. 13 is a diagrammatic representation of all twelve steps of my method;

FIG. 14 is a diagram enlarged to about 1000 times actual size illustrating what each step accomplishes geometrically with respect to the lens with the exception of the rounding and blending of the transition ridges between adjacent angles around the peripheral edge of the lens;

FIG. 15 is a similar diagram showing the finished result wherein the lens edge is perfectly rounded and all transition ridges blended;

FIGS. 16 and 17 are diagrams similar to FIGS. 2a and 2b to show my method applied to highly negative and highly positive lenses respectively; and FIG. 18 is a sectional view similar to FIG. 2 showing an alternate method of grinding a lens to size.

On the accompanying drawings I have used the reference character L to indicate a lens blank throughout the figures of the drawings, which lens blank when furnished by the manufacturer is a "semi-finished" lens and has a diameter $D^1$ in FIG. 1, the peripheral edge of the lens being somewhat rough from cutting or grinding to this diameter, and the diameter being such as to permit the cutting of a maximum diameter lens therefrom or any one of several smaller sizes such as the size indicated at $D^3$. The first step (1) in my method consists of sizing the lens L as by cutting it to the diameter indicated $D^2$ which may be 0.05 to 0.1 millimeter over the desired or finished diameter after the polishing operations have been completed in accordance with my method. The periphery of the lens at diameter $D^2$ is indicated 36. The unfinished lens L as depicted in FIG. 1 however would have the base curve 20 thereof cut on a lathe or ground to a specified radius and then polished to final smoothness, and likewise the anterior curve 22 thereof. The curve 22 is the dioptric power curve of the lens as it is related to the base curve 20 to power the lens either plano, negative or positive to the degree prescribed.

To size the lens it is held by means of a suitable lens holder 26 such as one of the vacuum cup type made of rubber or the like as shown in FIG. 1a, the original shape being shown dotted and the solid lines showing the shape the holder assumes after being squeezed, its open end moistened and contacted with the moistened inner surface 20 of the lens L, and released, whereupon the resiliency in the rubber produces a vacuum in the hollow portion of the holder to hold the lens to the holder during sizing as well as subsequent grinding and polishing operations. The lens is of course rotated during the sizing operation of step (1) so that the periphery remains concentric with the lens axis.

Steps (1) to (12) inclusive are shown diagrammatically in FIG. 13 and the step numbers are enclosed in circles.

In step (1) of my method, the lens L is ground to "size" or the desired diameter as on a grindstone 80.

In step (2) of my method a bevel 28 is ground on the anterior surface ("AS" in FIG. 13) of the lens L by means of an emery stone 24 shown in FIG. 2, dotted lines being used to indicate the original shape of the lens before the bevel 28 is ground. Instead of a grinding operation the lens can be chucked in a lathe and the bevel 28 formed by cutting with a suitable lathe tool. This bevel is ground or cut to minimize possible contact of the eyelids with the edge of the lens and tends to allow the lens freedom for movement with the movement of the eye and eliminates lid scratching, irritation and inflammation which usually result in side effects such as the discharge of an oily secretion and mucous matter onto the cornea and muscle spasms from the lids hitting the edge of the lens. The bevel causes the eyelid to readily arch over the edge portion of the lens and creates a space between the lid and the lens edge which eliminates knocking the lens out of the eye, and the lens tends to stay centered to a greater degree. The bevel may be somewhat of the extent shown in FIG. 2a in the event a secondary curve 30 is to be cut on the posterior surface of the lens, or may be of greater extent as shown at 28a in FIG. 2b if there is to be no secondary curve. The included angle of the concavity in the stone 24 may be 90° as indicated or may vary ±10° from this angle, though in most lenses 90° is satisfactory. The stone 24 may rotate approximately 1200 r.p.m. for this grinding operation without detrimental effect to the surface at 28, that is, the surface will be somewhat rough and possibly crazed but it is only a "roughed" surface as distinguished from a "polished" surface and is yet to be polished.

Step (3) of my method is illustrated in FIG. 3 and this consists of a touch-polishing operation on the bevel 28. This is accomplished by a polishing tool 32 that has a concavity also at the same angle (90°) as the concavity in FIG. 2, and the concavity of the tool 32 is lined with padding 34 such as felt, velvet or moleskin cemented thereto. The padding is charged with a suitable fine polishing agent such as stannic oxide and water for producing the desired polishing and blending action. In FIG. 3a I show an enlargement of the surface being polished and have exaggerated the amount of material removed by the polishing action in order to illustrate that this action also slightly rounds the bevel 28. For instance, the original shape of the bevel is indicated by the dotted line 28 while the original shape of the surface of the padding 34 is indicated by the dotted line 34a. However, since padding of the type mentioned is somewhat resilient and flexible the bevel 28 will be depressed into it and the final bevel that results from the touch-polishing action is indicated at 28b—somewhat curved and its extremities somewhat rounded and thereby blended into the adjacent anterior curve 22 and the edge 36 of the lens.

I have found it advantageous to rotate the polishing tool 32 relatively slowly such as 80 to 120 r.p.m. and merely "touch" the lens to the polishing tool—that is, hold the lens lightly against the padding 34 by use of the holder 26 (which has been omitted from the showing in FIGS. 2 and 3) for a few seconds so as to subject the lens to an average of 10 to 25 revolutions of the polishing pad 34 relative thereto. Thus at a speed of 80 r.p.m. the lens should be touched to the polishing pad 7 or 8 seconds to 18 or 20 seconds whereas at 120 r.p.m. it should be touched thereto only about 5 to 12 seconds. A method step of this type may be defined as "touch-polishing." Certain of the touch-polishing steps should be longer than others as will hereinafter appear.

Step (4) of my method is shown in FIG. 4 and consists of reversing the lens L on the holder 26, so as to operate on its posterior surface instead of its anterior surface, and the grinding of the secondary curve 30 referred to in connection with FIG. 2a on the posterior surface ("PS in FIG. 13) of the lens. This curve 30 is ground on a secondary curve stone 38 having its surface formed on a radius somewhat greater than the radius of the base curve 20 of the lens. For instance, lenses have inside curvatures in the neighborhood of 7.8 mm. and the radius for the secondary curve 30 may be 12 mm. or thereabouts. The stone 38 may rotate about 1200 r.p.m. for quickly roughing the secondary curve 30 and the lens is advantageously held to the side of the axis of rotation as illustrated in FIG. 13 (4). FIG. 4a illustrates the material 30a (shaded) which is removed to form the secondary curve 30.

The curve 30 is then touch-polished as in FIG. 5, step (5), by a secondary curve polishing tool 40 having a polishing pad 42 thereon similar to the pad 34 in FIG. 3. The upper surface of the pad 42 is likewise on a radius of 12 mm. or whatever corresponds to the particular secondary curve stone 38 used. The resulting surface is shown at 30b in FIG. 5a.

Step (6) comprises a touch-polishing operation for blending the transition between the curves 20 and 30 and may be performed by a polishing tool 44 suitably shaped having a polishing pad 46 thereon, and the curvature of the upper end of the tool 44 is some intermediate radius between that for the curve 20 (such as 7.8 mm.) and the curve 30 (12 mm.) such as 9.5 mm. As shown exaggerated in FIG. 6a, the transition from the inner curve 20 to the secondary curve 30 of the lens L is a ridge 48 shown by dotted lines which would irritate the cornea. This is blended by polishing it off on the pad 46 to the contour indicated at 48a, this contour being depressed into the surface of the pad and the original surface outline being indicated dotted at 46a.

In the event that the lens L is not to have the secondary curvature 30 (FIG. 2ᵃ), steps (4), (5) and (6) are omitted, so that after step (3), step (7) is next in order. The lens in that case is made with the relatively wide bevel 28a as shown in FIG. 2ᵇ so that the bevel when formed brings the edge of the lens down to substantially the same sharpness as in FIG. 2ᵃ. Actually, the extreme edge of the lens may be "sharp" or of a width less than 0.1 mm. to produce the desired finished size $D^3$ after the edge-rounding operations performed in steps (7) to (10) and (12) have been completed.

Step (7) of my method utilizes a touch-polishing tool 50 having a flat upper surface on which a polishing pad 52 is located, thus giving a 180° included angle polish to the lens. This contours its posterior peripheral edge 54 to the shape shown at 54a, in FIG. 7ᵃ, the normal surface of the pad 52 being shown dotted at 52a.

Steps (8), (9), (10) and (12) are performed similarly to the foregoing with the following exceptions. In FIG. 8 the included angle is 140° as indicated, or thereabouts, and the pad 58 on the tool 56 changes the contour 54a of FIG. 7ᵃ to the contour 54b of FIG. 8ᵃ. The contour 54a of FIG. 7ᵃ is shown dotted in FIG. 8ᵃ and the normal surface of the pad 58 is shown dotted at 58a.

Step (9) in FIG. 9 has an included angle of 90° or thereabouts (FIG. 13) and the contour 54b of FIG. 8ᵃ (shown dotted in FIG. 9ᵃ) is changed to 54c, the normally flat surface of the pad 62 being shown dotted at 62a.

Step (10) shown in FIG. 10 has the tool 64 with an included angle of 60° or thereabouts, and the pad 66 changes the contour 54c of FIG. 9ᵃ (shown dotted in FIG. 10ᵃ) to the contour 54d, the normally flat surface of the pad 66 being shown dotted at 66a.

In FIG. 11, step (11), the lens is reversed again for finishing the anterior peripheral margin thereof and the included angle of the tool 68 is 90° the same as it was in step (3) so that polishing pad 70 produces a slight further polishing and rounding operation on the contour 28b of FIG. 3ᵃ (shown dotted in FIG. 11ᵃ) to the contour 28c, the normally flat surface of the pad 70 being indicated at 70a in dotted lines. This operation has a more important function, however, and that is to remove any burr formed on the anterior peripheral edge by step (10).

In FIG. 12, step (12) the included angle of the polishing tool 72 is 60° or thereabouts in order to further round the contour 28c of FIG. 11ᵃ to the contour 28d, the surface of the polishing pad 74 being indicated in dotted lines at 74a.

The foregoing twelve steps are summarized in FIG. 12, the numerals (1) to (12) in circles above the representations of the lens, the grinders and polishing tools being the step numbers and the included angles and radii of the grinding and polishing tools are indicated, as well as whether the operation is on the anterior (AS) or posterior (PS) surfaces of the lens.

If the lens were ground only instead of being polished as by my method, the result would be a semi-finished lens, the edge of which would appear as at 36a in FIG. 14 produced by grinding operations (1) to (12) inclusive, corresponding to my grinding and/or polishing operations, and the ridges produced by the various angles thus superposed on the edge of the lens would have to be blended thereafter as by buffing. Buffing operations on lenses with ridges of this character are free-hand operations and if not carefully done may result in considerable irregularity in the blending and in the surface of the lens adjacent to where these ridges occur so that from one standpoint a minimum of buffing is desirable. I have found, however, that lenses thus buffed are still rough. The tendency, therefore, is to over-buff in order to be sure that all incremental areas are blended and this results in still greater inaccuracies in the surface of the lens, as well as some undesirable departure from the intended curvatures 20 and 22. Also, it is usual to do the buffing with a rag-type buffing wheel at 1200 to 1300 r.p.m., and to do all the buffing at one time requires usually several minutes which prohibitively heats the lens, causing microscopic crazing and scratching that cannot be readily seen except in a high-powered microscope but which is injurious to the cornea and eyelids, as hereinbefore referred to.

On the other hand, my method eliminates excess heat by reducing surface contact between the lens and the polishing tool, and because of reduced speed, thereby obtaining greatly improved finishing and polishing of the edge and edge portions of the lens. Since each polishing step is merely a "touch" and lasts only a few seconds, and since each polishing tool is shaped to desired radii or angles, there is much greater uniformity of finish in the lenses finished by my methods, and concentricity of the contour produced by each polishing step which produce an improved surface impossible to obtain by buffing.

It would be possible to grind a lens as depicted in FIG. 14 and then with short polishing steps, comparable to my steps (3), (7), (8), (9), (10) and (12) in FIG. 13, obtain substantially the same end result, the perfectly rounded edge 36b of FIG. 15. However, I find that if the number of steps depicted are used (with steps (4), (5) and (6) omitted if there is to be no secondary curve 30) complete rounding and perfect polishing may be effected. Sometimes it is also advantageous to use step (13) at about 40° (shown dotted in FIGS. 13 and 14). Using fewer steps (angles not so closely proportioned) satisfactory rounding does not result whereas additional steps (angles proportionately closer to each other) may result in slight improvement in the rounding or blending of each touch relative to the adjacent one, yet from a practical standpoint are unnecessary and would, therefore, increase the over-all finishing and polishing time. The problem, of course, is to find a happy medium between perfect rounding and blending versus insufficient blending, with the over-all time for finishing and polishing at a minimum.

FIG. 14 also illustrates that steps (7), (8), (9) and (10) polish off successively less material and accordingly their timing should vary such as 20, 15, 10 and 5 seconds respectively. By arranging the various tools for steps (1) to (12) and (13) if used along a workbench, or in a circle, it is possible to quickly size a lens, step (1) and then perform the successive steps (3), and (5) to (12), within a total time period of one to two minutes. This excludes the cutting or grinding operations of steps (1), (2) and (4) which require variable time periods, depending on the amount of material that must be removed. Timing would be reduced by 10 to 15 seconds if touch-polishing steps (5) and (6) are omitted.

The sequence of steps outlined in FIG. 13 may be varied considerably such as performing them in the order (1) to (6), (12), (13) and (7) to (10), varying steps (1) to (3) with steps (4) to (12), reversal of steps (7), (8), (9) and (10) or performing them in any different order as may be desired by the workman performing the method. In that event the various tools throughout the steps could be arranged in a different order for successive use.

My method permits varying the bevel 28 to suit a highly negative lens such as shown at $L^1$ in FIG. 16, making it longer such as 28c instead of 28 in FIG. 2ᵃ, or 28f if the secondary curve 30 is not desired. The bevel width is increased by merely grinding for a longer period of time in step (2). Regardless of the width of the bevel, it may still be polished on the touch-polish tool 32—34 of step (3). If the lens is highly positive as $L^2$ in FIG. 17, the bevel may not be needed unless there is no secondary curve 30 whereupon the bevel would be 28g. A still higher powered positive lens (anterior surface 22c) might not even then require a bevel.

FIG. 18 illustrates another method of sizing the lens by grinding its edge in the conical cavity 78 of a sizing stone 76 having a 50° included angle. All grinding operations referred to throughout my specification are preferably of the wet type to avoid burning the lenses.

All lenses finished by my method will have the same roundness and features of edge (not true by present practices of the industry). The tool angles may vary 10°± and the speeds mentioned may also vary to some extent and still secure satisfactory results. Because of substantial heat generated in the present practice, there is a change in molecular structure of the lens and it looks burned, crazed and roughened under a microscope—which causes some of the eye irritation problems above referred to that are eliminated by my method and apparatus.

Some changes may be made in the construction and arrangement of the parts of my apparatus and the steps of my method may be varied to some extent without departing from the real spirit and purpose of my invention. Accordingly, it is my intention to cover by my claims any modified forms of structure, use of mechanical equivalents, or use of mechanically equivalent method steps, which may reasonably be included within their scope.

I claim as my invention:

1. In a method for finishing a semi-finished contact lens on rotating grinders and polishers, the steps of circularly size-grinding the lens slightly larger than the finally desired diameter thereof, circularly bevel-grinding the anterior marginal periphery thereof, circularly touch-polishing such bevel, circularly grinding a secondary radius on the posterior marginal periphery of the lens, circularly touch-polishing said secondary radius, blending the transition area between the base curve of the lens and said secondary radius by circularly touch-polishing thereof on a radius intermediate the base curve and said secondary radius, circularly touch-polishing the posterior marginal edge of said lens in a series of steps at varying angles, again circularly touch-polishing the anterior marginal peripheral edge of said lens along said bevel to remove burrs resulting from touch-polishing the posterior surface of the lens, and circularly touch-polishing the anterior peripheral edge of the transition between said bevel and the lens periphery resulting from said touch-polishing steps performed on the posterior surface thereof whereby the resulting peripheral edge of said lens is smoothly rounded to such degree as to minimize cornea and eyelid irritation when the lens is worn on a cornea.

2. In a method for finishing a semi-finished contact lens on rotating grinders and polishers, the steps of circularly size-grinding the lens 0.05 to 0.1 mm. greater than the finally desired diameter thereof, circularly beveling the anterior marginal periphery thereof by grinding on a grinder rotating at relatively high speed, circularly touch-polishing such bevel for a few seconds on a polisher rotating at relatively low speed, circularly grinding a secondary radius on the posterior marginal periphery of the lens on a grinder rotating at relatively high speed, circularly touch-polishing said secondary radius for a few seconds on a polisher rotating at relatively low speed, blending the transition area between the base curve of the lens and said secondary radius by circularly touch-polishing thereof on a polisher rotating at relatively low speed, and for a relatively short period of time on a radius between the base curve and said secondary radius, circularly touch-polishing the posterior marginal edge of said lens in a series of at least four steps beginning at approximately 180° included angle and ending with approximately 60° included angle, and finally circularly touch-polishing the anterior marginal surface of the peripheral edge of said lens at approximately 60° whereby the resulting peripheral edge of said lens is smoothly polished and rounded.

3. A method for finishing semi-finished contact lenses on rotating grinders and polishers comprising the steps of beveling the anterior marginal periphery of a lens at 90°±10° by circularly grinding on a grinder rotating at approximately 1200 r.p.m., circularly touch-polishing such bevel for approximately 5 to 8 seconds on a polisher rotating at approximately 80 to 120 r.p.m., circularly grinding a secondary radius on the posterior marginal periphery of the lens on a grinder rotating at approximately 1200 r.p.m., circularly touch-polishing said secondary radius for approximately 5 to 8 seconds on a polisher rotating at approximately 80 to 120 r.p.m., blending the transition area between the base curve of the lens and said secondary radius by circularly touch-polishing thereof on a radius intermediate between the base curve and said secondary radius on a polisher rotating at approximately 80 to 120 r.p.m. and for approximately 5 to 8 seconds, circularly touch-polishing the posterior marginal edge of said lens in a series of steps of successively smaller included angles such as 180°, 140°, 90° and 60°±10°, circularly touch-polishing for approximately 5 to 8 seconds on a polisher rotating at approximately 80 to 120 r.p.m. the anterior marginal surface of the peripheral edge of said lens at 90° to refinish said bevel and remove burrs resulting from touch-polishing the posterior surface of the lens, and circularly touch-polishing for approximately 5 to 8 seconds on a polisher rotating at approximately 80 to 120 r.p.m. at 60°±10° the anterior edge of said lens.

4. A method for finishing semi-finished contact lenses on rotating grinders and polishers comprising the steps of circularly size-grinding the lens slightly larger than the final desired diameter thereof, circularly bevel-grinding the anterior marginal periphery thereof, circularly touch-polishing said bevel, circularly touch-polishing the posterior marginal edge of said lens in a series of steps beginning at substantially 180° included angle and ending with substantially 60° included angle, again circularly touch-polishing said bevel to remove burrs resulting from touch-polishing the posterior surface of the lens, and circularly touch-polishing the anterior peripheral edge of said lens to blend the perimeter of said bevel with the periphery of the lens.

5. In a method for finishing semi-finished contact lenses on rotating grinders and polishers, the steps of circularly size-grinding the lens approximately 0.05 to 0.1 mm. greater than the desired diameter thereof, beveling the anterior marginal periphery thereof by circularly grinding on a grinder rotating at relatively high speed, circularly touch-polishing such bevel for a few seconds on a polisher rotating at relatively low speed, circularly touch-polishing the posterior marginal edge of said lens in a series of at least four steps beginning at a relatively large angle followed by successively smaller angles, and finally circularly touch-polishing the anterior marginal peripheral edge of said lens whereby the resulting peripheral edge thereof is smoothly rounded and polished.

6. In a method for finishing contact lenses on rotating grinders and polishers, the steps of beveling the anterior marginal periphery of a lens to substantially 90° included angle by circularly grinding on a grinder rotating at approximately 1200 r.p.m., circularly touch-polishing such bevel 5 to 8 seconds on a polisher rotating at 80 to 120 r.p.m., circularly touch-polishing the posterior marginal edge of said lens in a series of four steps beginning at 180° included angle and at successively smaller included angles, such as 140°, 90° and 60°±10°, again circularly touch-polishing said bevel at substantially 90°, and circularly touch-polishing the posterior peripheral edge of the lens at 60°±10°.

7. In a method for finishing semi-finished contact lenses on rotating grinders and polishers, the steps of circularly touch-polishing the posterior marginal edge of said lens in a series of steps beginning at substantially 180° included angle and ending with substantially 60° included angle, and circularly touch-polishing the anterior marginal peripheral edge of said lens at substantially 60°.

8. A method for finishing contact lenses on rotating grinders and polishers comprising the steps of circularly size-grinding a lens slightly larger than the final desired diameter thereof, circularly touch-polishing the posterior marginal edge of said lens in a series of at least four steps beginning at 180° included angle ±10° and ending with 60° included angle ±10°, and circularly touch-polishing the anterior marginal peripheral edge of said lens at least at one angle to smoothly round such edge thereof.

9. In a method for finishing semi-finished contact lenses on rotating grinders and polishers, the steps of circularly size-grinding the lens 0.05 to 0.1 mm. greater than the desired diameter thereof, circularly touch-polishing the posterior marginal edge of said lens in a series of successively smaller included angles such as 180°, 140°, 90° and 60° each ±10°, and finally circularly touch-polishing the anterior marginal peripheral edge of said lens to blend the anterior surface thereof with the peripheral edge thereof.

References Cited in the file of this patent

UNITED STATES PATENTS

| | | |
|---|---|---|
| 2,352,616 | Canning | July 4, 1944 |
| 2,674,068 | Eves et al. | Apr. 6, 1954 |
| 2,693,063 | Dillon | Nov. 2, 1954 |
| 2,748,541 | Connell | June 5, 1956 |